UNITED STATES PATENT OFFICE.

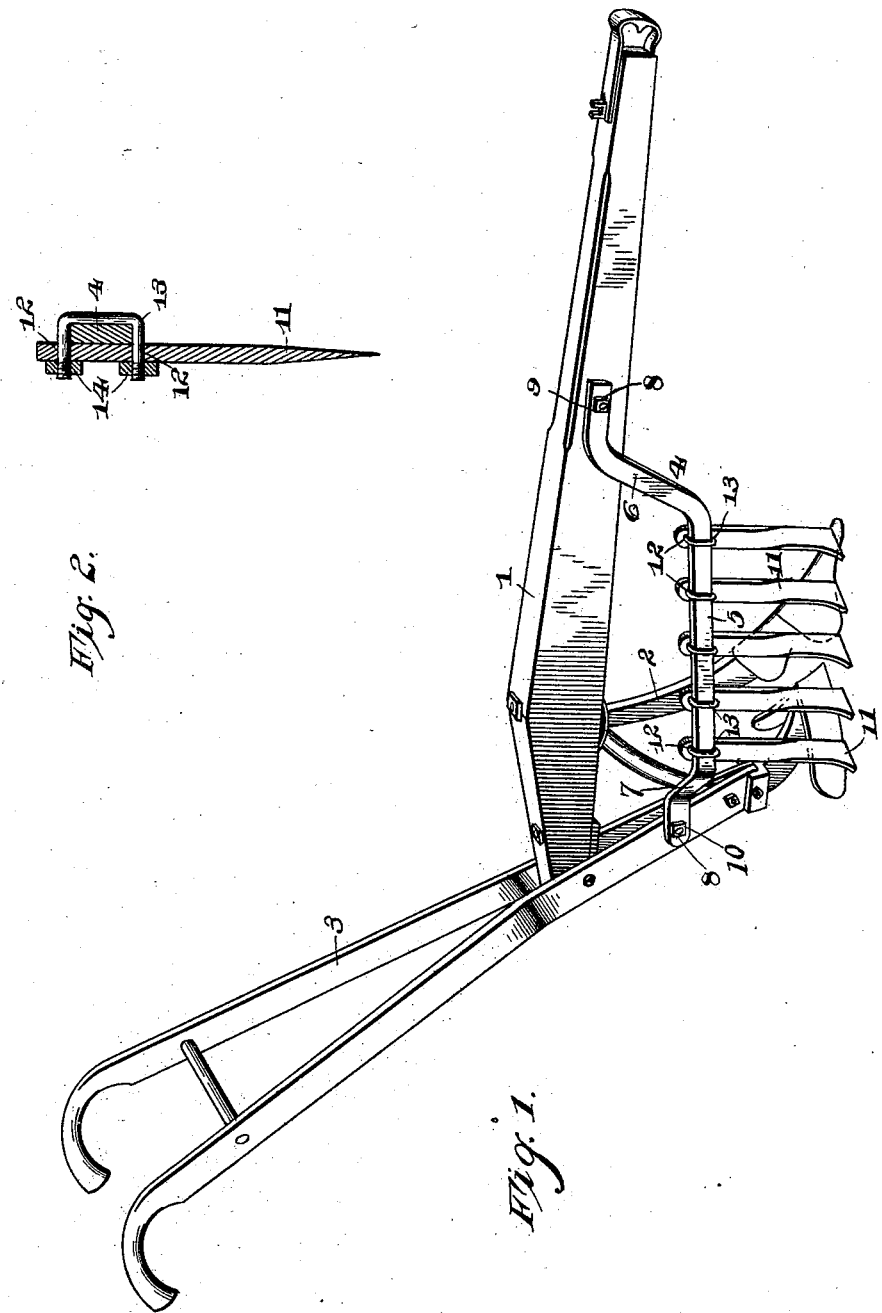

LEONIDAS E. PRIDGEN, OF SNOW HILL, NORTH CAROLINA.

ATTACHMENT FOR PLOWS.

SPECIFICATION forming part of Letters Patent No. 508,119, dated November 7, 1893.

Application filed July 7, 1893. Serial No. 479,841. (No model.)

*To all whom it may concern:*

Be it known that I, LEONIDAS E. PRIDGEN, a citizen of the United States, residing at Snow Hill, in the county of Greene and State of North Carolina, have invented a new and useful Attachment for Plows, of which the following is a specification.

My invention relates to attachments for plows, and to that particular class thereof designed to be located at the sides of plows for the purpose of preventing, during cultivation adjacent to rows of plants, the discharge thereover and thereagainst of hard, unbroken lumps or clods of soil.

The objects of my invention are to provide a cheap and simple device of this character, the same being so constructed and arranged as to be readily applied and removed and in which the fender or guard portion may be regulated or adjusted so as to exclude lumps or clods of any undesirable size, and permit of the passage therebetween of only such soil as may be properly pulverized or broken and not liable to injure the plants.

With these and other objects in view the invention consists in certain features of construction hereinafter specified and particularly pointed out in the claim.

Referring to the drawings:—Figure 1 is a perspective view of a plow or cultivator provided with an attachment embodying my invention. Fig. 2 is a detail in transverse section of the attachment.

Like numerals of reference indicate like parts in both the figures of the drawings.

The plow beam 1, standard 2, and handles 3, are of the usual construction, said handles in this instance depending below the beam and being secured to the heel of the plow.

The attachment consists of a bar 4 of iron, the same having a centrally depressed portion 5, by which is meant a portion disposed below the terminals of the bar. These terminals, designated as 6 and 7, are provided with bolt holes 8, the front terminal 6 being secured to the side of the beam by a bolt 9 and the rear terminal 7 by a bolt 10 being secured to the corresponding side of one of the handle bars 3. The attachment is removable and may be applied to any ordinary form of plow or cultivator, and if necessary, the terminals 6 and 7 may be disposed at variance with those herein shown in order to adapt them to the particular style of plow with which the attachment is to be used. Regardless, however, of the shape or configuration of the bar 4, I arrange with the inner side of the same and adjacent to the mold board side of the cultivator a series of depending teeth 11. Each tooth is provided with a pair of perforations 12 and the bars embraced by a series of staples 13, the terminals of the said staples passing above and below the bar and passing through the perforations 12 heretofore mentioned as being formed in the teeth. The terminals of the staples or clips are threaded and nuts 14 are applied thereto. Of course, any number of teeth and staples may be employed upon the bar and their number will depend upon the distance apart which it is desired to set the teeth, as will be dictated by the fineness of the soil which it is desired to throw toward the plants. In adjusting the teeth it is simply necessary to loosen the nuts 14 and to slide the teeth to proper points upon the bar, after which retighten the nuts thus drawing the clips and teeth snugly together and binding them rigid.

The operation and use of the invention are well understood by those familiar with this class of inventions, and it seems simply necessary to state that as the cultivator or plow moves along the side of a row of plants the soil turned by the mold board is broken to a great extent against the guard and forced through it, thus being pulverized to a predetermined degree before being thrown toward the plants. Extremely large clods are prevented from passing through the guard and crushing the plants.

The particular shape of bar 6 is especially adapted to that class of plows wherein the handle-bars extend below the stock and connect to the moldboard. The fact that the rear end of the bar is in the same horizontal plane as that portion of the bar to which the teeth are attached, enables the bar to withstand greater strain than if its rear end were inclined and connected to the beam, as is ordinarily the case. For this reason not only is greater resistance to the strain aggregated, but a lighter bar may be employed.

Having described my invention, what I claim is—

The combination with the plow-beam, the handle-bars depending therebelow, and the share, of the bar 4 having the upwardly disposed terminal 6 bolted to the side of the beam, and the rear horizontal terminal 7 bolted to the handle-bar, and the series of teeth depending from the beam and twisted as shown, substantially as specified.

In testimony that I claim the foregoing as my own I have hereto affixed my signature in the presence of two witnesses.

LEONIDAS E. PRIDGEN.

Witnesses:
 JOSIAH EXUM,
 W. H. DAIL.